Nov. 2, 1937.   C. E. HAGLER   2,098,092
FEED MECHANISM FOR COTTON HULLERS AND CLEANERS
Filed Sept. 4, 1934   2 Sheets-Sheet 1
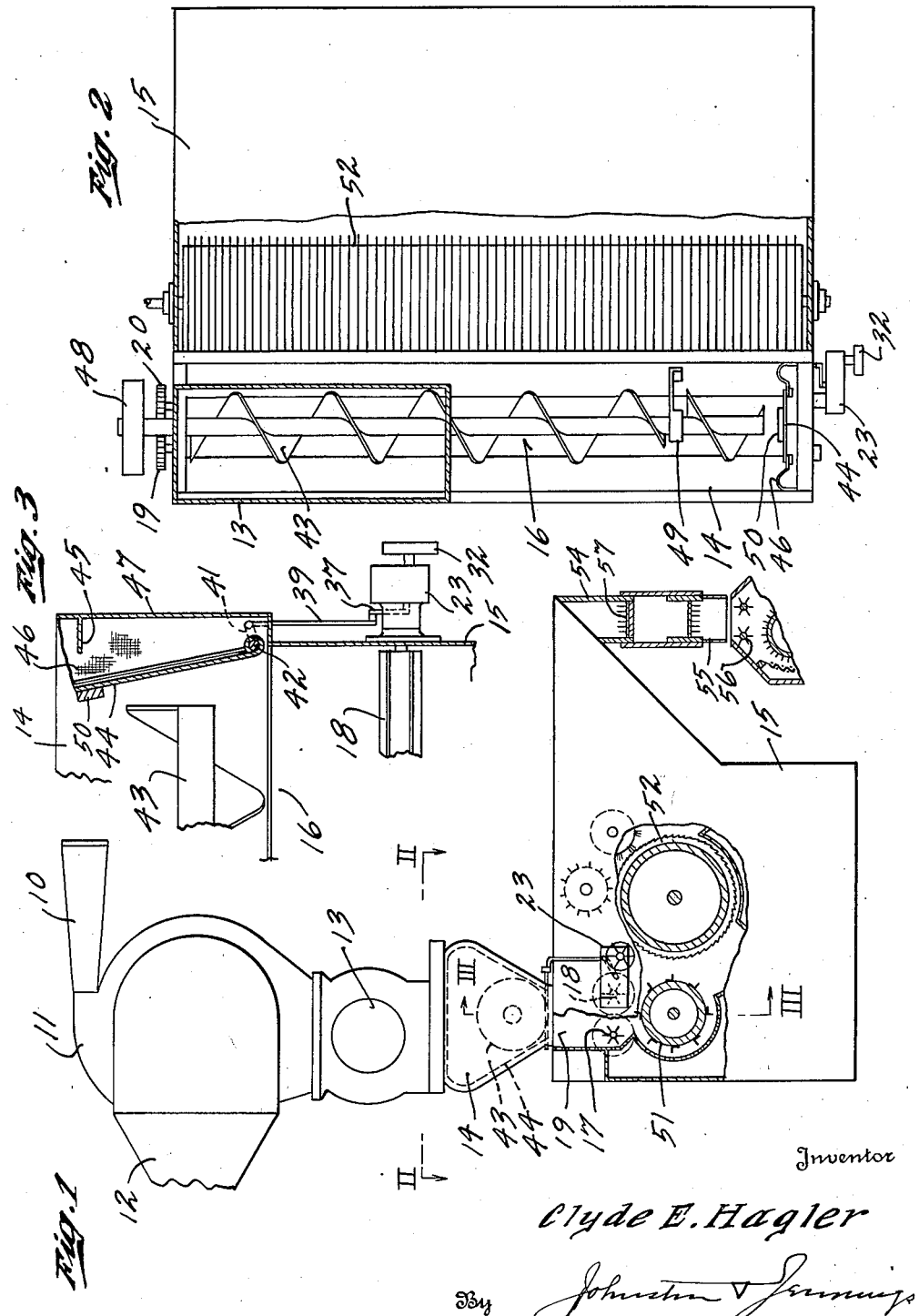
Inventor
Clyde E. Hagler
By Johnston & Jennings
Attorneys Nov. 2, 1937.   C. E. HAGLER   2,098,092
FEED MECHANISM FOR COTTON HULLERS AND CLEANERS
Filed Sept. 4, 1934   2 Sheets-Sheet 2

Inventor
Clyde E. Hagler
By Johnston & Jennings
Attorneys

Patented Nov. 2, 1937

2,098,092

UNITED STATES PATENT OFFICE 2,098,092

FEED MECHANISM FOR COTTON HULLERS AND CLEANERS

Clyde E. Hagler, Birmingham, Ala., assignor to Continental Gin Company, a corporation of Delaware Application September 4, 1934, Serial No. 742,564

15 Claims. (Cl. 19—69)

My invention relates to extractors or cleaners for the treatment of seed cotton containing an excessive amount of burrs, bolls and trash to remove a substantial amount of the latter before the cotton enters the gins.

My invention is more particularly, but not exclusively, concerned with preliminary extractors, commonly known to the trade as big burr extractors, which are very large, cumbersome and expensive mechanisms that are designed to take the irregular feed of seed cotton, burrs, trash and the like from the wagons and work the whole mass through them without any provision being made for any regulation of their feed, or for any distribution of the entering mass of material so that it may be more efficiently treated, or for any overflow of seed cotton when it is fed faster than the extractors can handle it.

The pneumatic or other elevator or conveyor systems employed to bring in the seed cotton from the wagons for treatment, due to irregular feed at the wagons, will from time to time deliver the cotton and accompanying foreign matter to the treatment mechanism in masses thereby producing an irregular feed to the preliminary treatment mechanism that is detrimental for many reasons.

It is well understood that gins or their feeders, which operate at a constant speed according to the characteristics of the material under treatment, will choke up quickly if the feed thereto becomes excessive. Because of this, it is customary to provide the distributor for the gins, or their feeder-cleaners, with what is termed an "overflow", so that cotton, in excess of the capacity of the gins or cleaner-feeders, can be carried off and returned by hand or other suitable means to the distributor. It is obvious also that it will be necessary to provide for an overflow or equivalent means in the feed to my extractor if the latter is to have feed rolls to regulate its rate of intake of cotton, etc.

I have obtained the best results from such preliminary extractors by providing means both to distribute and regulate the feed of cotton, etc., thereto, because by such means the cotton stream can best be formed and presented successively to the working parts of the extractor so as to enable them to function most efficiently in the removal of foreign matter therefrom. It is, therefore, an object of my invention to devise a feed mechanism for my extractor that will deliver the cotton and accompanying foreign matter thereto in a wide thin stream that is substantially uniform across its width and that in width corresponds substantially to the length of the cotton treating portion of the working parts of the extractor.

The cotton and foreign matter of which such a stream is composed will not have relative movement transversely thereof, but will tend to move in a direct path past the successive work elements of the extractor and in so moving the foreign matter in the stream will be most effectively exposed so that it can be readily extracted from the cotton stream.

I have found that such preliminary extractors can accommodate themselves, with but slight loss in efficiency, to widely varying rates of feed and I propose to dispense with any overflow means for the extractor, that would otherwise be necessary, by varying the rate of drive of its feed rolls as to take up and carry off through it any excess of cotton in the distributor for, or in the supply line to, its feed rolls. Thus, when an excessive supply of seed cotton occurs, the feed rolls can, responsive to automatic control, be rapidly accelerated causing the surplus cotton to pass off quickly through the extractor without overflowing or choking it.

While my invention contemplates the arrangement of the cotton and accompanying foreign matter into a wide substantially uniform stream as it enters the preliminary extractor and I prefer to accomplish this by the use of a mechanical distributor above the extractor's feed rolls, nevertheless one may use any means for feeding the seed cotton to the extractor that will enable its feed rolls to present it in a stream of substantially uniform mass across the full width of the work chamber in the extractor.

My invention further comprises novel means, sensitive to any excessive feed of seed cotton, to regulate automatically the rate of drive for the extractor's feed rolls and consequently the rate of movement of the cotton through the extractor.

My invention further comprises a novel variable-speed drive for the feed rolls that is simple, easily adjusted and flexible and that will so respond to its control means as to produce the rate of feed required for the extractor to handle the irregular supply of cotton thereto.

More particularly, my invention contemplates providing in a distributor of the character above described, a conveyor and at its delivery end a movable control element which will respond to the pressure thereon of an excess or overflow of cotton to accomplish the speeding up of the feeder roll drive of the extractor.

My invention further contemplates the association with a distributor and automatic control mechanism, such as have been above described, of a very simple and effective variable speed drive for the feed rolls of the huller cleaner, the drive comprising a plurality of over-running roller clutches having drive elements spring-pressed against a set of eccentric actuators with a cam movable responsive to the control element in the distributor to vary the angular drive motion imparted by each eccentric through its clutches to the feed rolls of the extractor.

My invention further comprises the novel details of construction and arrangements of parts which in their preferred embodiment only are hereinafter more particularly described and claimed, reference being had to the accompanying drawings which illustrate only the preferred embodiment of my invention, and in which:—

Fig. 1 is an end view of a cotton separator for a pneumatic cotton conveyor system having my distributor means interposed between it and the feed rolls of an extractor which is shown partly in section and partly in end elevation with the extractor indicated merely in outline with its working parts other than its feed rolls, hull breaker and saw omitted as their detail structure forms no part of my present invention.

Fig. 2 is a cross sectional view taken on the line II—II of Fig. 1 showing the distributor and extractor in plan partly broken away to show the saw cylinder of the extractor.

Fig. 3 is an enlarged detail view taken on the section III—III of Fig. 1, showing the relation of the control element in the distributor to the variable speed drive for the extractor feed rolls.

Similar reference numerals refer to similar parts throughout the drawings.

Figure 4:
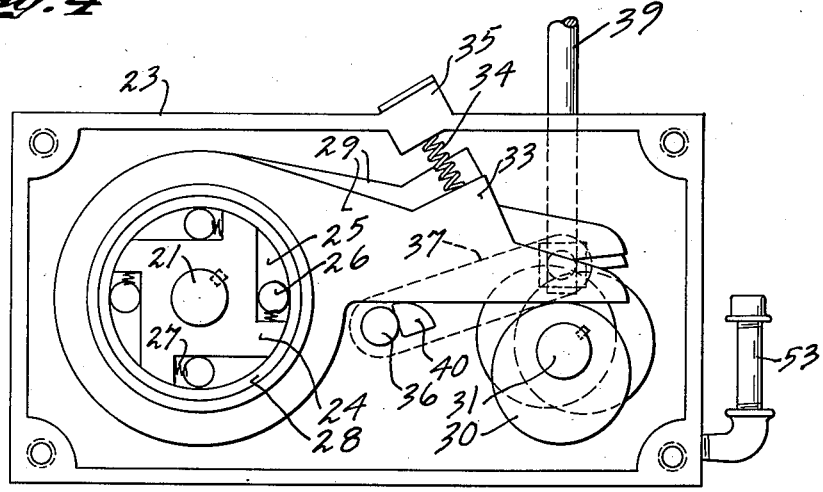
Fig. 4 is a view of the variable speed drive box for the feed rolls of the extractor shown with its outer cover removed.
Figure 5:
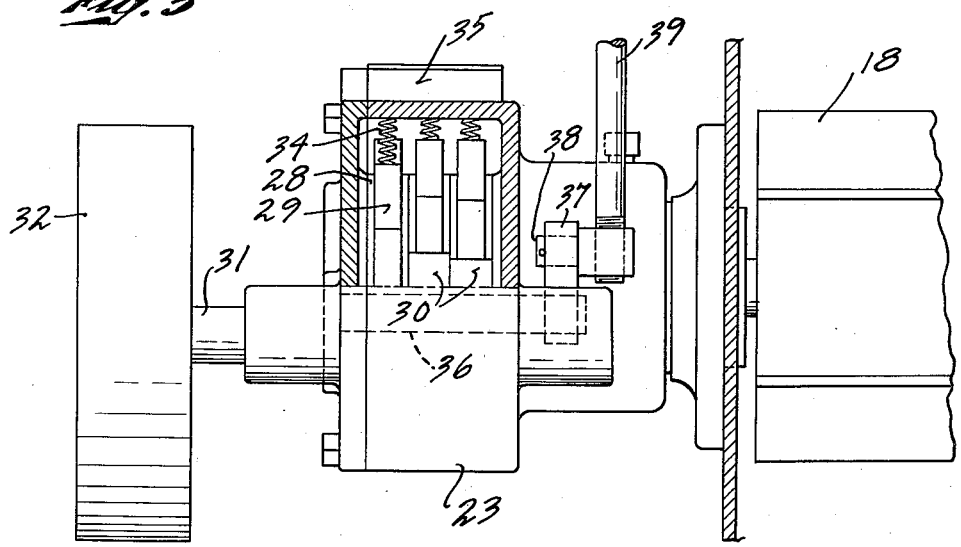
Fig. 5 is an end view partly in section showing one end of the extractor feed roll and its variable speed drive.

In the embodiment of my invention which I have shown for the purposes of illustration, a pneumatic cotton conveying duct 10 delivers the seed cotton into the separator 11 from which the air escapes through the duct 12 while the cotton is discharged by a vacuum feeder 13 into one end of a distributor trough 14, which extends the full width of the extractor casing 15 and has a bottom slot 16 coextensive therewith through which the seed cotton containing hulls and trash is delivered in a thin substantially uniform stream to the feed rolls 17 and 18 disposed lengthwise across the inlet passage 19 of the extractor.

The feed rolls 17 and 18 are of usual construction having at one end gears 19 and 20 which mesh to drive the rolls in unison, the shaft 21 of the roll 18 extending through its bearing and entering the casing 23 of the variable speed mechanism shown on Sheet 2 of the drawings.

The shaft 21 carries fast thereon a driven clutch element 24 provided with longitudinal right angled slots 25 cut on equi-distant centers along its periphery to form seats for rollers 26, which are seated in the grooves and pressed laterally toward their working position by means of coil springs 27 which are seated slightly below the center line of the rollers so as to cause them to change position as they work. Four seats 25 are shown in the element 24 and there are three sets of four rollers working in these seats and with each set of rollers is associated an outer ring 28, which rings abut endwise and fit loosely between the side walls of the casing 23. Fast on each ring is a drive arm 29 having an extension overhanging one of a series of eccentrics 30 that are mounted equi-distantly about the drive shaft 31 which is journaled in the casing 23 and has fast on its outer end a drive pulley 32.

Each of the drive arms 29 is provided on its upper edge with an inclined spring seat 33 engaged by a coil spring 34 mounted in a seat 35 provided therefor in the top of the casing. These springs hold the drive arms in engagement with their respective eccentrics 30, and the arms and rings as drive elements are associated with the rollers and driven element 24 to form over-running roller clutches which act in the following manner.

As each eccentric raises its drive arm 29 against the action of its spring 34 it rotates its ring 28 counterclockwise and the ring, being in engagement with the several rolls of its set due to their being pressed by their respective springs between their seats and the converging wall of the ring, will impart movement through the driven clutch element 24 to the feed roll shaft 21, giving it an angular stroke corresponding to the angular motion imparted to the drive arm.

The regulation of the speed of the drive is effected by means of a control shaft 36 journaled in the casing 23 with its inner end projecting therefrom toward the extractor housing and there provided with a crank arm 37 pivotally connected by a pin 38 to the lower end of a control arm 39. The shaft 36 within the casing 23 is provided with a cam surface 40 disposed in the path of the several drive arms so that as the crank is raised the spring-pressed down movement of the drive arms will all be checked so that they will stop at a greater or less distance from the drive shaft 31 for the eccentrics. This controls the extent of the drive which the eccentrics are capable of imparting to the drive arms and as a result it will likewise determine the angular motion imparted by each eccentric to the feed roll shaft 21 and thus will control the rate of feed of material into the extractor.

The control arm 39, as shown more clearly in Fig. 3, has its upper end connected to a crank 41 fast on a rocker shaft 42 that is set across the bottom of the distributor trough 14 at the discharge end of the screw conveyor 43 that extends lengthwise of said trough over its discharge slot 16 and will be disposed under the vacuum feeder 13 so that it will act to carry the cotton discharged by the feeder lengthwise of the distributor trough. In the event more cotton is being received than can be taken up and delivered into the extractor by the feed rollers 17 and 18, there will result a congestion in the distributor 14 which will cause the screw conveyor 43 therein to press the excess or overflow cotton against a plate 44 mounted fast on the rocker shaft 42 so as to force the latter outwardly from its normal position shown in Fig. 3 until it engages a stop 45.

Side curtains 46 connect the plate to the end wall 47 of the trough 14 and prevent the access of cotton behind the plate. An excess of cotton in the distributor trough will thus rock the plate 44 and through crank 41 will depress the control arm 39 and rock crank 37 and its cam 40 so as to permit the drive arms 29 to move more closely to the drive shaft 31 for the eccentrics and thereby to have an increased eccentric throw imparted to them and consequently to speed up the rate of feed of the rolls 17 and 18 and thereby to carry off the excess of cotton that is congested in the distributor. When this has been accomplished, the weight of the plate 44 will rock it inwardly, causing it to raise the cam 40 and decrease the eccentric throw imparted to the drive arms and restore the drive for the feed rolls 17, 18 to normal. A counterweight 50 may be provided in the plate 44 to insure its downward swing.

The screw conveyor has a drive pulley 48 and is journaled at one end in an end wall of the distributor trough 14 and at the other end in a bearing 49 spaced from the other end wall of said trough, thus leaving the end of the screw conveyor free so that there will be no interference with the control action it exerts on the rocker plate 44.

In the operation of my invention, assuming that the cotton is being dropped from the vacuum feeder 13 at the rate at which it is desired that the feed rolls 17 and 18 shall deliver it into the extractor for treatment, such cotton, notwithstanding that it enters at one end of the trough, 14 will be distributed lengthwise therein so that it will fall uniformly therefrom throughout the length of the slot 16 onto the feed rolls 17 and 18 which will thus receive an equal feed throughout their length. So long as this action continues the feed rolls will deliver a thin uniform bat or stream across the full width of the huller cleaner to the agencies operating therein which are typified by the hull breaker cylinder 51 and the saw 52, thereby permitting them to perform their duties in the most effective and efficient manner and making each extractor working element equally effective throughout its entire extent.

When the feed of cotton to the distributor becomes excessive, the overflow of cotton collects between the discharge end of the screw conveyor and the control plate 44 and acts to rock the latter, which through the transmission described will rock the control cam 40 downwardly to increase the throw of the eccentrics exerted on their respective drive arms. This increases the angular motion imparted as a result of the actuation of each drive arm directly to the feed roll 18 through shaft 21, and through the gears 19 and 20 is imparted to the feed roll 17, and thus the feed to the extractor is varied and proportioned to suit the feed to its distributor without change in the speed of the eccentric shaft. The drive box 23 is normally filled with oil nearly to the upper level of its oil inlet 53.

It will be obvious that a very rugged but very accurate and reliable control is thus made, responsive to variations in the supply of cotton to the feeder means for the extractor, to regulate the rate of feed. Thus I avoid the disadvantages that will result where any portion of a work element in the extractor is called upon for greater duty than other portions of such element, and I also save the expense of providing and maintaining an overflow for the extractor.

When I refer to an extractor I mean to include any mechanism suited to remove hulls, trash or the like from the seed cotton preparatory to delivering it to the distributors that feed the gins.

The big burr extractor is shown in Fig. 1 discharging the cotton stream into a distributor trough 54 having bottom ducts 55 leading to the gin feeder rolls 56. Any distributor means such as the belt 57 may be used to so handle the cotton as to fill the ducts 55 and discharge any overflow in the customary manner.

While I have illustrated my invention as embodied in a big burr extractor, it is applicable to any cotton treating mechanism which has a variable capacity and a variable feed, where it is desired to avoid an overflow as a means for taking care of an excessive supply of cotton and eliminate such excess by an automatic acceleration of the feed.

It will be obvious to those skilled in the art that my invention is susceptible of various changes and modifications, without departing from the spirit thereof, and I desire, therefore, that only such limitations shall be placed thereupon as are imposed by the prior art or as are specifically set forth in the appended claims.

What I claim is:—

1. The combination with a distributor for the gins and a pneumatic conveyor system for supplying seed cotton thereto, of a preliminary cleaner mechanism interposed between said conveyor system and distributor and comprising feed rolls having a variable-speed drive, a means to deliver seed cotton from said conveyor system to said feed rolls, and means responsive to the presence of an excess of seed cotton in said delivery means to accelerate the rate of drive for said feed rolls.

2. The combination with a seed cotton elevator and a distributor for supplying seed cotton to gins, of an interposed preliminary cleaner which delivers into said distributor and comprises feed rolls having a variable-speed drive, and cotton controlled means to regulate the rate of drive of said rolls to keep the volumetric flow of cotton therethrough roughly proportioned to the variable rate at which it is supplied thereto by said conveyor.

3. The combination with means to elevate and distribute seed cotton to gins, and a preliminary cleaner through which the whole supply of seed cotton passes in a stream from said elevator to said distribution means; said cleaner comprising rotatable work elements for extracting burrs and foreign matter from said passing stream of cotton, means to feed the cotton thereto in a stream having substantially the width of its said work elements, and means automatically responsive to the accumulation of an excessive supply of cotton ahead of said feed means to increase the rate of flow of said stream.

4. In combination, a pneumatic elevator for seed cotton, a large burr extractor having work elements for extracting foreign matter from the cotton and a distributor and feeder means to spread the entering cotton into a stream in width substantially coextensive with said work elements, means responsive to an excessive supply of cotton to said distributor means to accelerate the rate of feed of said cotton stream into said extractor by accelerating said feeder means, and a distributor to receive said stream of treated cotton and deliver same to further treatment apparatus.

5. In combination, an extractor for the removal of hulls, trash and the like from a stream of cotton, feeder means for the extractor having a variable speed drive, a distributor for delivering cotton to said feed means, means to deliver cotton to said distributor, and means which respond to an abnormal supply of cotton in said distributor and act to accelerate the rate of feed to the extractor.

6. In combination, an extractor for the removal of hulls, trash and the like from a stream of seed cotton, feed rolls for the extractor having a variable speed drive, a controller for said drive to vary the rate of feed, and means adapted to respond to the accumulation of an abnormal supply of cotton ahead of said feed rolls and having an operative connection with said controller thereby to regulate the rate of feed to the extractor.

7. In combination, an extractor for the removal of hulls, trash and the like from seed cotton comprising feed rolls having a variable speed drive, a distributor trough having a screw conveyor for delivering cotton to said rolls, a movable control element at the delivery end of said screw and adapted to be actuated by an excess of cotton opposite it, and means responsive to the actuation of said control element to speed up said drive.

8. In combination, an extractor for seed cotton, feed rolls therefor, a variable speed drive for said rolls, a distributor for feeding cotton to said rolls comprising a trough having therein a bottom outlet and means to move cotton over said outlet toward one end of the trough, a hinged plate at said latter end of the trough normally disposed in its inner position and adapted to be forced to its outer position by an excess of cotton in the distributor, and means responsive to the displacement of said plate to change said drive and increase the rate of feed of said feed rolls.

9. In combination, an extractor for the removal of hulls, trash and the like from seed cotton comprising feed rolls having a variable speed drive, a distributor trough having a screw conveyor for delivering cotton to said rolls, a rocker plate hinged at the delivery end of said screw and counter-balanced to swing inwardly, flexible side guards for said plate which is adapted to be actuated by an excess of cotton opposite it, and means responsive to the actuation of said control element to speed up said drive.

10. In combination, a cotton delivery means, a distributor trough into one end of which said means delivers cotton, there being a bottom slot for the cotton discharge and a screw adapted to feed the entering cotton along said trough, a plate hinged opposite the delivery end of said screw, means normally disposing the plate inwardly of the trough but which yield to the pressure of cotton to allow the plate to swing outwardly, control means actuated by such movements of the plate, a cotton treating machine having a feed means into which said distributor delivers cotton, and a variable speed drive for said feed means regulable by said control means.

11. In combination, a cotton treating machine having a feed means and a variable speed drive therefor, comprising a series of roller clutches having individual drive arms and eccentrics for driving same and a regulator to arrest the approach of said arms to said eccentrics, a distributor for delivering cotton to said feed means, and means movable by an excess supply of cotton to said distributor to shift said regulator and increase the rate of feed to said machine.

12. A cotton treating machine having a distributor, a feed means to which the distributor delivers, a variable speed drive for said feed means comprising driving eccentrics, drive arms actuated thereby, roller clutches driven by said arms, and a rocker stop arm to limit the throw of said arms; and a controller movable by the pressure of an excess supply of cotton in said distributor to shift said rocker stop arm and increase the rate of drive to carry off said excess of cotton in the distributor.

13. The combination with a pneumatic conveyor for seed cotton having a separator and a discharge for the cotton, of an extractor, an elongated distributor with one end under said discharge and adapted to spread the discharged cotton for the full width of the extractor and deliver it all thereinto in a wide relatively thin stream, the extractor having rotatable feed and work elements which engage said stream successively across its entire width, and cotton controlled means to vary the speed of drive of said feed elements proportionally to the supply of cotton to be fed.

14. In combination, an extractor of the character described having work elements, a drive therefor, and feed rolls geared together, a series of independent clutch elements for driving said rolls, a series of actuators operated by the extractor drive and adapted to oscillate said clutch elements to drive said feed rolls, and means to accelerate the rate of the clutch drive imparted to the feed rolls responsive to the accumulation of an excess supply of cotton ahead of said feed rolls.

15. In combination, conveyor means which normally delivers a variable supply of cotton or the like for treatment, controller means interposed in the path of the cotton supply and adapted to respond to variations above the normal volumetric flow of the cotton supply, a cotton treatment machine supplied by said conveyor at a point beyond said controller and having variable speed feed means which control the rate of flow of the cotton fed thereinto, and means to vary said rate responsive to and in substantial conformity with said controller.

CLYDE E. HAGLER.